United States Patent [19]
Cipolla

[11] Patent Number: 5,897,222
[45] Date of Patent: Apr. 27, 1999

[54] DISABLING MECHANISM FOR HOLDING METERING SPROCKET DISENGAGED FROM FILMSTRIP TO PERMIT FINAL FILM WINDING INTO CARTRIDGE IN CAMERA

[75] Inventor: David Cipolla, Pittsford, N.Y.

[73] Assignee: Eastman Kodak Company, Rochester, N.Y.

[21] Appl. No.: 09/020,986

[22] Filed: Feb. 9, 1998

[51] Int. Cl.[6] .................................................. G03B 17/24
[52] U.S. Cl. ................................ 396/6; 396/284; 396/399
[58] Field of Search ............................... 396/396; 7/411, 7/284, 6, 397, 399, 400

[56] References Cited

U.S. PATENT DOCUMENTS

| | | |
|---|---|---|
| 2,289,827 | 7/1942 | Crumrine . |
| 3,925,798 | 12/1975 | Sanada et al. . |
| 4,075,647 | 2/1978 | Johnson . |
| 4,400,074 | 8/1983 | Akiyama et al. . |
| 4,540,261 | 9/1985 | Matsumoto et al. . |
| 4,884,087 | 11/1989 | Mochida et al. . |
| 5,005,035 | 4/1991 | Pagano . |
| 5,235,366 | 8/1993 | Kucmerowski . |
| 5,682,569 | 10/1997 | Katsura . |

Primary Examiner—David M. Gray
Attorney, Agent, or Firm—Roger A. Fields

[57] ABSTRACT

A camera comprising a film winder rotatable in engagement with a film spool inside a cartridge to wind an exposed filmstrip into the cartridge, a frame counter rotatable to indicate the number of exposures remaining for picture-taking and having a circular array of teeth that are successively engaged to rotate the frame counter, a metering sprocket engaged intermittently with successive perforations in the filmstrip to rotate the metering sprocket as the filmstrip is wound into the cartridge, an actuator coaxially connected to the metering sprocket for rotation in engagement with the respective teeth to rotate the frame counter, and a disabling mechanism for preventing rotation of the frame counter after the last exposure is made and keeping the metering sprocket disengaged from anyone of the film perforations to permit rotation of the film winder to complete film winding into the cartridge without rotating the frame counter and the metering sprocket, is characterized in that the disabling mechanism is coaxially connected to the actuator for engaging the frame counter when the metering sprocket is disengaged from the film perforations, to prevent rotation of the frame counter and the metering sprocket as the film winder is rotated to complete film winding into the cartridge.

6 Claims, 5 Drawing Sheets

DISABLING MECHANISM FOR HOLDING METERING SPROCKET DISENGAGED FROM FILMSTRIP TO PERMIT FINAL FILM WINDING INTO CARTRIDGE IN CAMERA

FIELD OF THE INVENTION

The invention relates generally to the field of photography, and in particular to one-time-use cameras. More specifically, the invention relates to a disabling mechanism for holding a metering sprocket disengaged from a filmstrip to permit final film winding into a cartridge after the last exposure is made in a one-time-use camera.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that intermittently engages the filmstrip at successive film perforations, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of opaque plastic front and rear cover parts house the main body part between them to complete the camera. The rear cover part connects to the main body part and/or to the front cover part to make the main body part light-tight. A decorative cardboard outer box or label at least partially covers the camera and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the respective film perforation to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and into the film cartridge, the one-time-use camera is given to a photofinisher who tears the outer box off the camera, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used parts of the camera may be recycled, i.e. reused, to remanufacture the camera.

Prior art U.S. Pat. No. 5,682,569 issued Oct. 28, 1997 discloses a one-time-use camera comprising a film winder rotatable in engagement with a film spool inside a cartridge to wind an exposed filmstrip into the cartridge, a frame counter rotatable to indicate the number of exposures remaining for picture-taking and having a circular array of teeth that are successively engaged to rotate the frame counter, a metering sprocket engaged intermittently with successive perforations in the filmstrip to rotate the metering sprocket as the filmstrip is wound into the cartridge, an actuator coaxially connected to the metering sprocket for rotation in engagement with the respective teeth to rotate the frame counter, and a disabling mechanism for preventing rotation of the frame counter after the last exposure is made and keeping the metering sprocket disengaged from anyone of the film perforations to permit rotation of the film winder to complete film winding into the cartridge without rotating the frame counter and the metering sprocket.

SUMMARY OF THE INVENTION

A camera comprising a film winder rotatable in engagement with a film spool inside a cartridge to wind an exposed filmstrip into the cartridge, a frame counter rotatable to indicate the number of exposures remaining for picture-taking and having a circular array of teeth that are successively engaged to rotate the frame counter, a metering sprocket engaged intermittently with successive perforations in the filmstrip to rotate the metering sprocket as the filmstrip is wound into the cartridge, an actuator coaxially connected to the metering sprocket for rotation in engagement with the respective teeth to rotate the frame counter, and a disabling mechanism for preventing rotation of the frame counter after the last exposure is made and keeping the metering sprocket disengaged from anyone of the film perforations to permit rotation of the film winder to complete film winding into the cartridge without rotating the frame counter and the metering sprocket, is characterized in that:

the disabling mechanism is coaxially connected to the actuator for engaging the frame counter when the metering sprocket is disengaged from the film perforations, to prevent rotation of the frame counter and the metering sprocket as the film winder is rotated to complete film winding into the cartridge.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
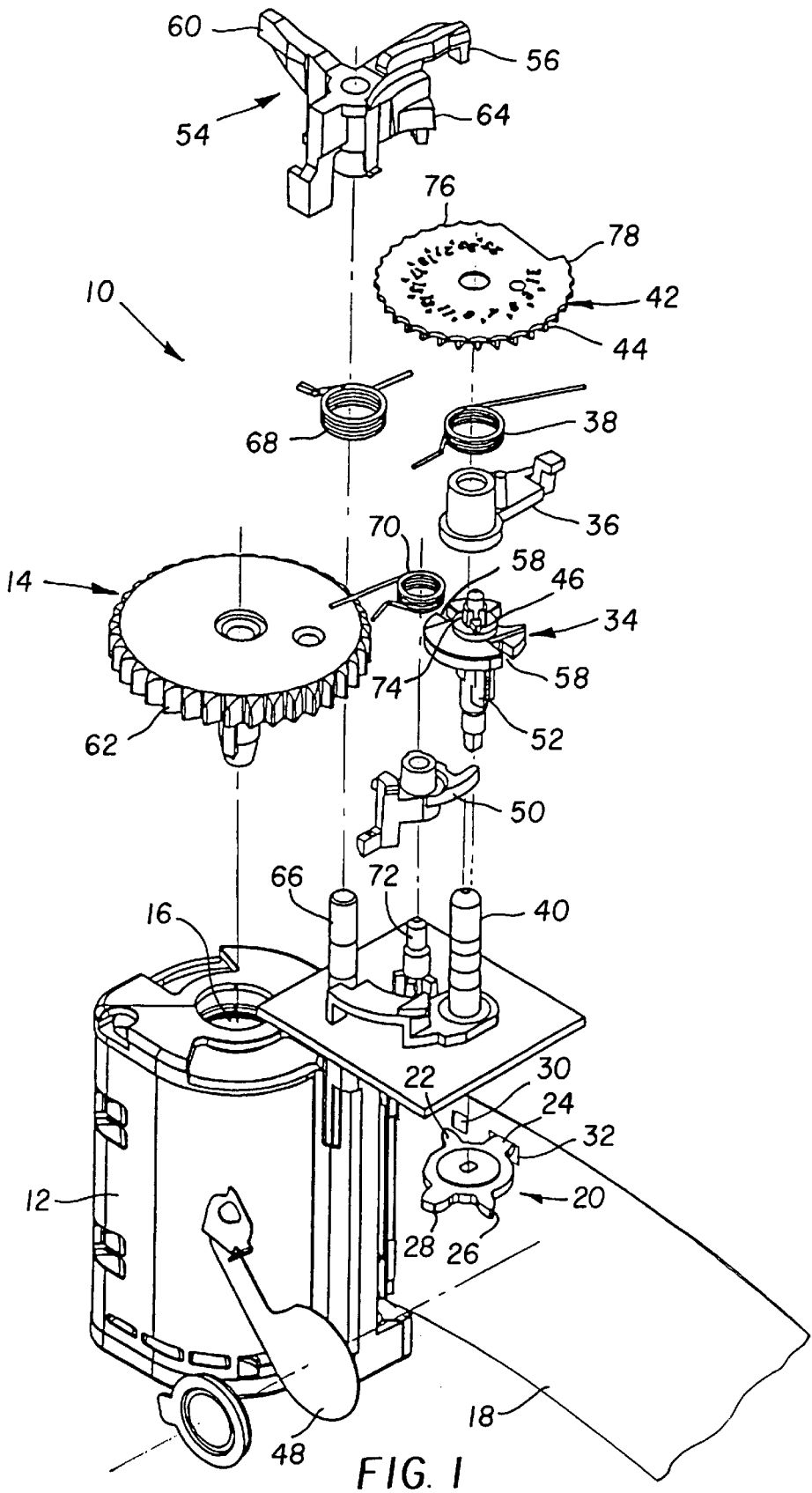
FIG. 1 is an exploded perspective view of portion of a camera according to a preferred embodiment of the invention.

Referring now to the drawings, FIG. 1 shows a portion of a one-time-use camera 10 comprising a known film cartridge 12; a manually rotatable film winder 14 rotated counter-clockwise in engagement with a protruding end of a film spool 16 inside the cartridge 12 to wind successive exposed frames of a filmstrip 18 into the cartridge after each picture is taken; a metering sprocket 20 having two separate pairs of small and large metering teeth 22, 24 and 26, 28 engaged intermittently with successive pairs of small and large perforations 30, 32 in the filmstrip 18 to cause the metering sprocket to be rotated counter-clockwise as each exposed film frame is wound into the cartridge 12; a metering cam 34 coaxially fixed to the metering sprocket 20 to be rotated counter-clockwise with the metering sprocket as each exposed film frame is wound into the cartridge 12; a biasing arm 36 urged via a torsion spring 38 to be rotated counter-clockwise about a fixed support post 40 and against the metering cam 34 to urge the metering cam to be rotated counter-clockwise to in turn rotate the metering sprocket 20 counter-clockwise in order to position either one of the small metering teeth 22 or 26 against the filmstrip 18 for re-engagement with one of the small film perforations 30; a frame counter 42 rotatable about the fixed support post 40 to indicate the number of exposures remaining for picture-taking and having a circular array of radial identical even-pitch teeth 44 successively engaged by a two-arm picker 46 (only one arm shown in FIG. 1) of the metering cam 34 to rotate the frame counter clockwise from one frame number indicating position to another when the metering cam and the metering sprocket 20 are concurrently rotated counter-clockwise; a shutter blade 48 pivotable clockwise against the opposite urging of a return spring (not shown) to momentarily uncover the filmstrip 18 to effect an exposure; a high energy lever 50 first cocked via either one of two opposite lobes 52 (only one shown in FIG. 1) on the metering cam 34 and then immediately released in a cocked position by the one lobe as the metering cam completes its rotation; and a metering lever 54 having a single protuberance 56 for being received in either one of two opposite notches 58, 58 in the metering cam 34 to arrest the metering cam and in turn the metering sprocket to maintain the filmstrip 18 in a metered position, having a locking arm 60 for simultaneously engaging anyone of thirty-six peripheral teeth 62 of the film winder 14 to arrest the film winder, and having a latching surface 64 for simultaneously engaging the high energy lever 50 to hold the high energy lever in its cocked position.

Figure 4:
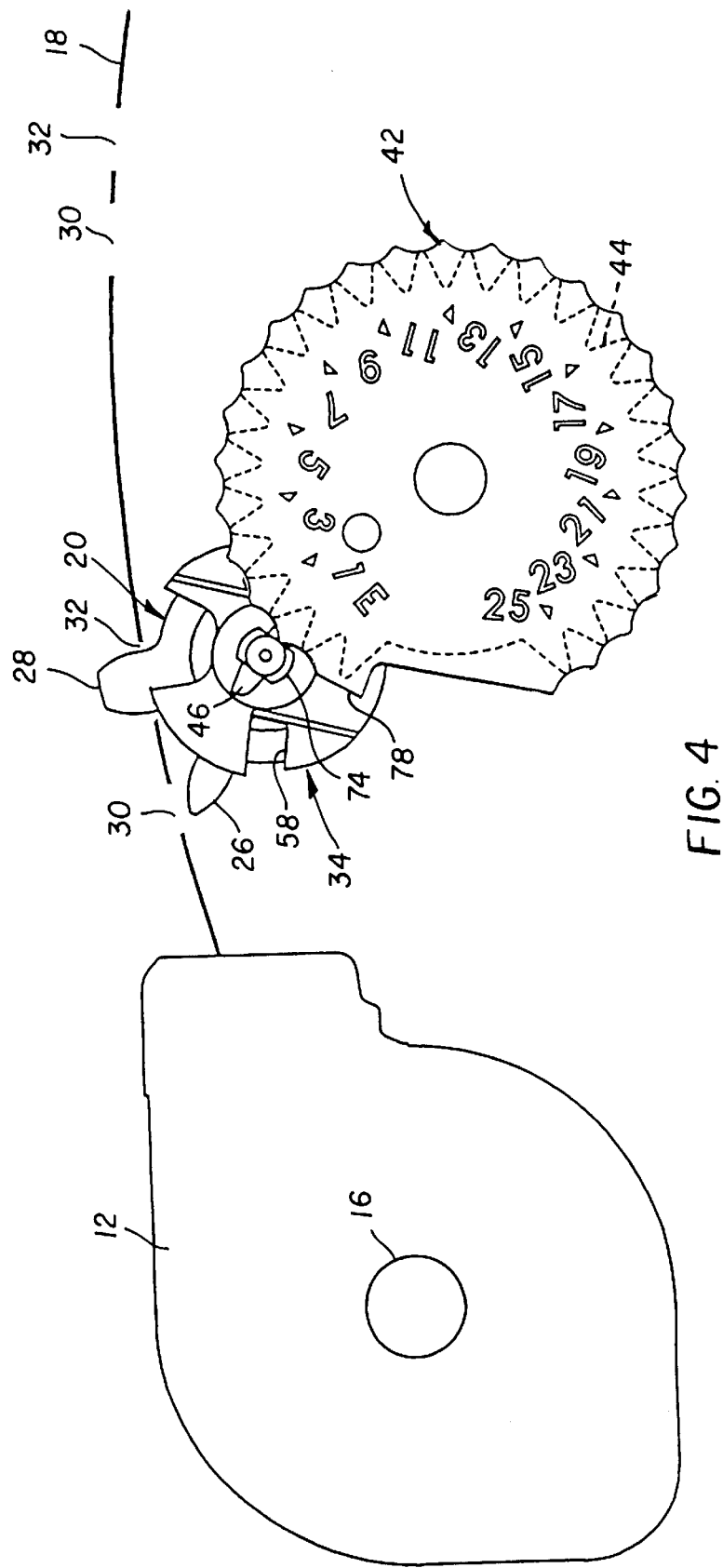

FIG. 4 shows the filmstrip 18 in its metered position. In this position, one of the large metering teeth 24 or 28 projects into one of the large film perforations 32. Also, one of the arms of the picker 46 of the metering cam 34 engages one of the teeth 44 of the frame counter 42.

When in FIG. 1 a shutter release button (not shown) is manually depressed to take a picture, the metering lever 54 is rotated counter-clockwise about a fixed support post 66 and against the opposite urging of a return spring 68 to disengage the locking arm 60 from an engaged one of the peripheral teeth 62 of the film winder 14 in order to release the film winder for manual rotation. Substantially simultaneously, the protuberance 56 of the metering lever 54 is disengaged from one of the two opposite notches 58 in the metering cam 34 to release the metering cam and in turn release the metering sprocket 20 in order to demeter the filmstrip 18, and the latching surface 64 of the metering lever is separated from the high energy lever 50 to allow a high energy spring 70 to rotate the high energy lever counter-clockwise about a fixed support post 72 from its cocked position in FIG. 1 in order to pivot the shutter blade 48 clockwise to effect an exposure.

Figure 2:
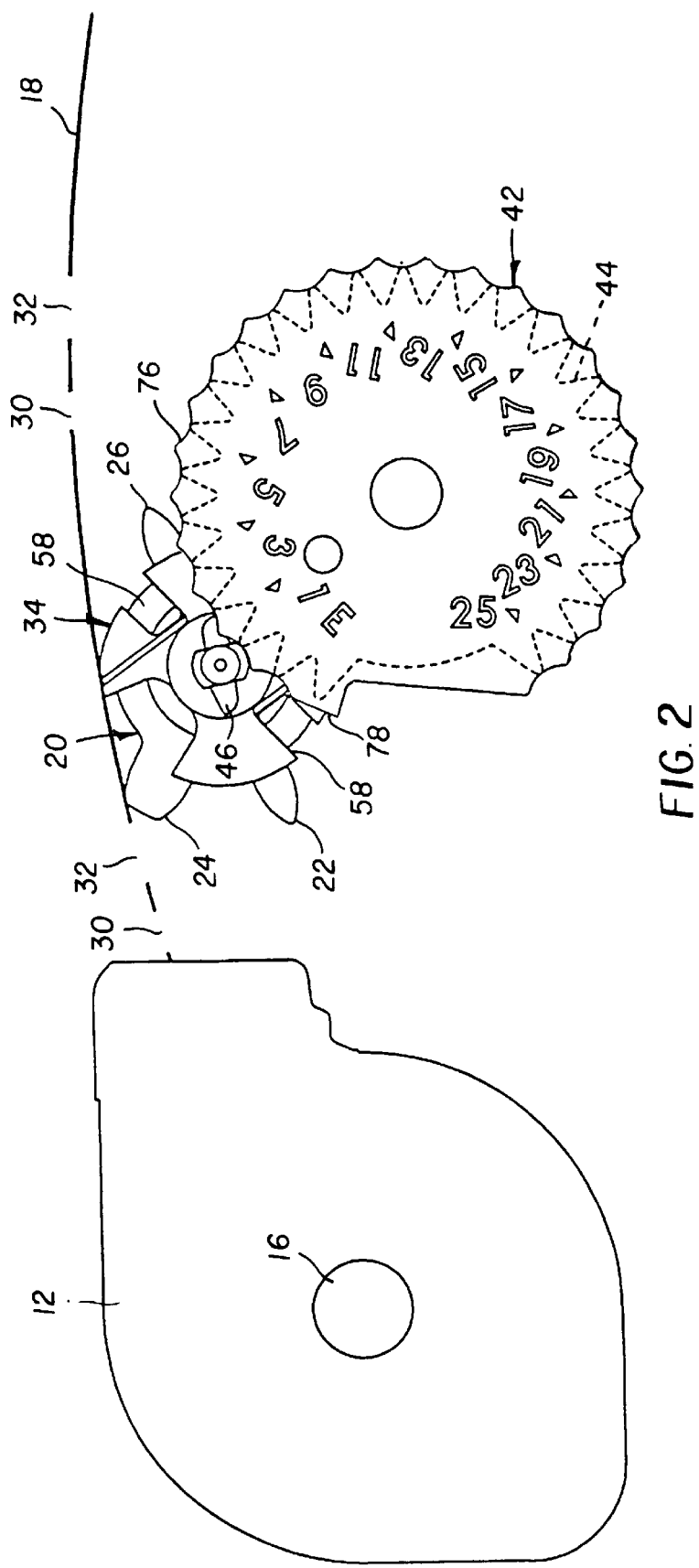
FIGS. 2–5 are plan views of the portion of the camera illustrating its operation.
Figure 3:
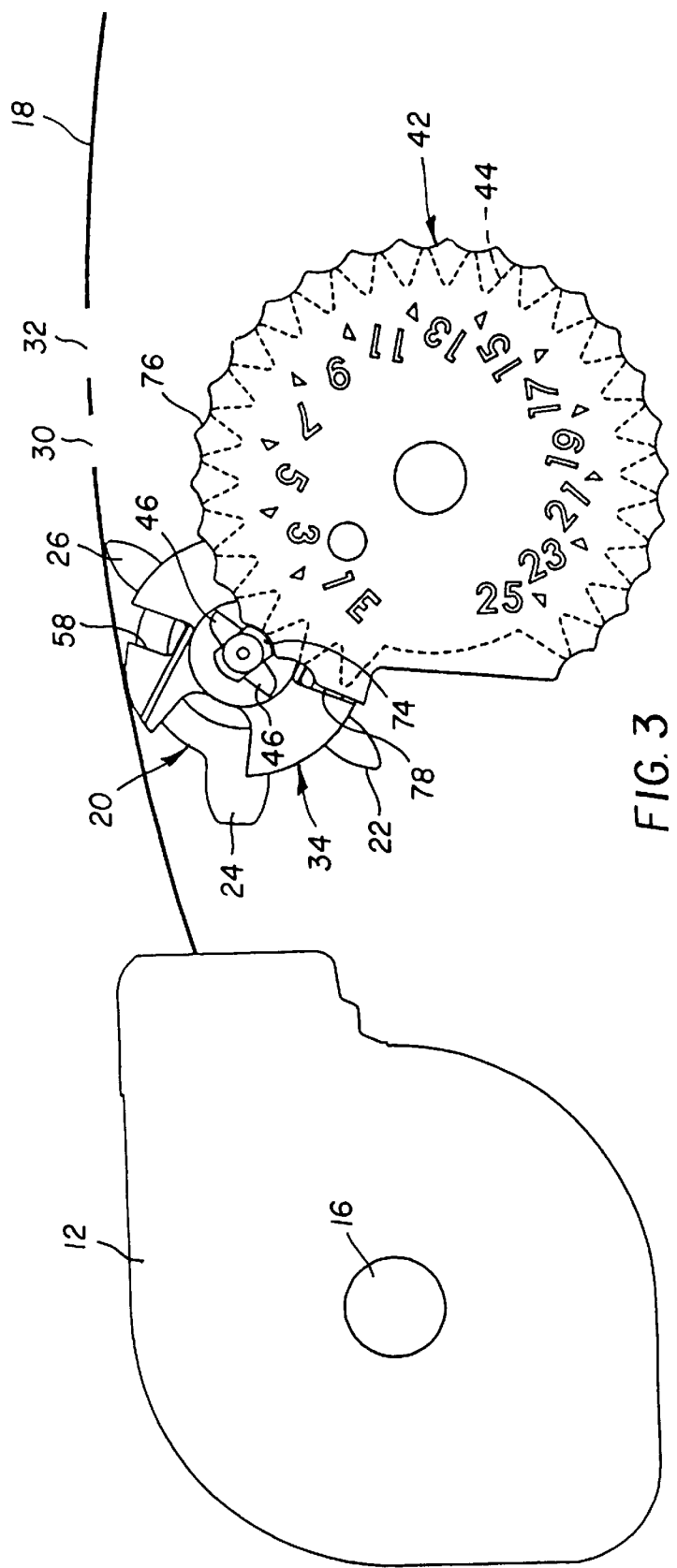

FIGS. 2 and 3 show the filmstrip 18 demetered. A two-arm holder 74 is coaxially connected to the picker 46 at right angles with respect to the picker as shown in FIGS. 2 and 3. The frame counter 42 has a circular array of scallops 76 one less than the number of the teeth 44 of the frame counter. The holder 74 is constructed to individually engage the scallops 76 one at a time when the picker 46 is not engaging anyone of the teeth 44, to hold the frame counter 42 in its frame number indicating position.

After the last exposure is made, it is intended to keep the two pairs of small and large metering teeth 22, 24 and 26, 28 disengaged from anyone of the two pairs of small and large perforations 30, 32 in the filmstrip 18 to keep the filmstrip 18 demetered and to prevent rotation of the metering sprocket which would rotate the metering cam 34. This permits the film winder 14 to be continuously rotated to complete film winding into the film cartridge 12 without the frame counter 42 being rotated and with the metering sprocket 20 disengaged from the film perforations 30, 32.

Figure 5:
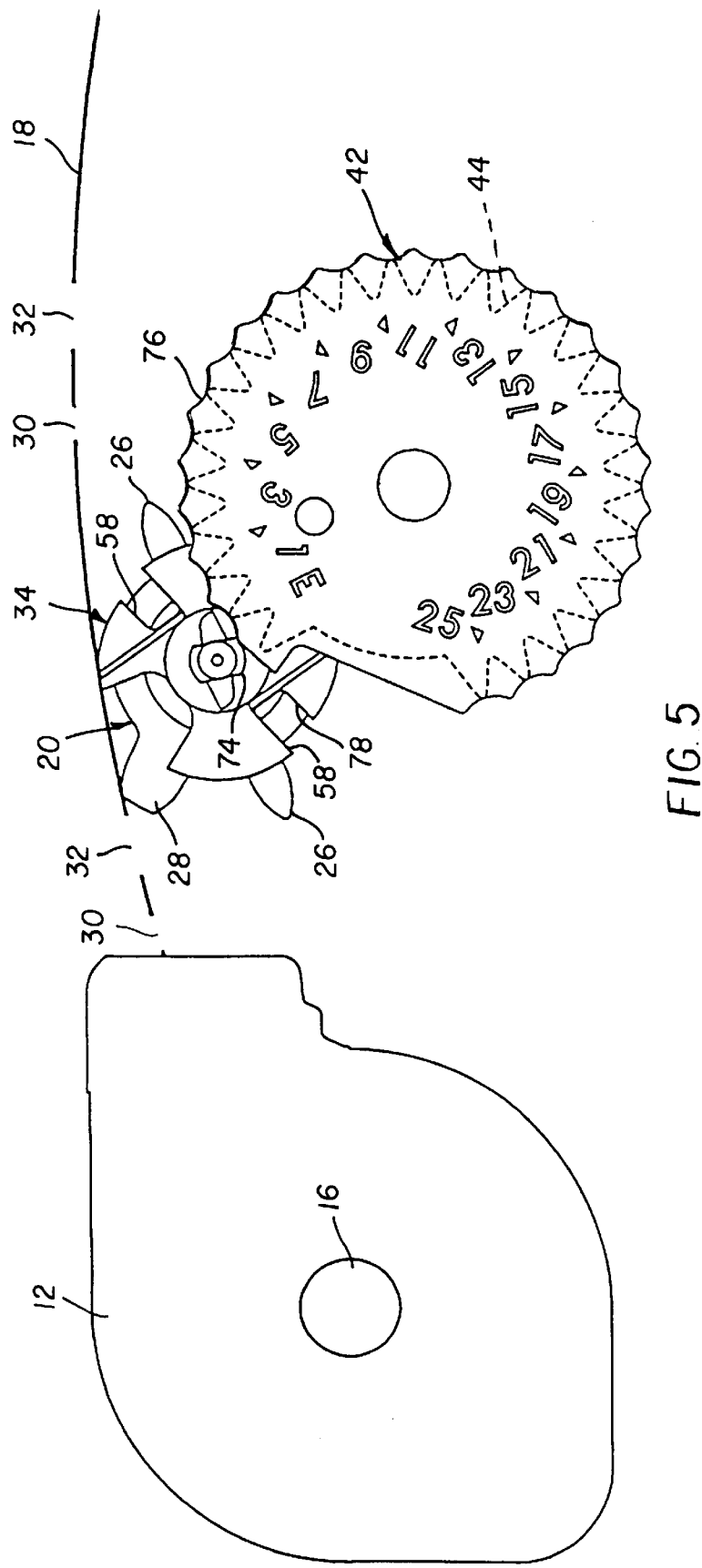

FIG. 5 illustrates rotation of the film winder 14 to complete film winding into the cartridge 12. The frame counter 42 has a segment 78 located between two of the scallops 76 that extents farther than the teeth 44 to project radially beyond the teeth which permits the segment to be contacted without interference from anyone of the teeth. In FIG. 5, the picker 46 has separated from one of the teeth 44 and the segment 78 is located opposite the holder 74, and the holder is rotated counter-clockwise to jam against the segment to prevent rotation of the frame counter 42 and the metering sprocket 20. At this time, the two pairs of small and large metering teeth 22, 24 and 26, 28 are disengaged from anyone of the two pairs of small and large perforations 30, 32 in the filmstrip 18.

The invention has been described with reference to a preferred embodiment. However, it will be appreciated that variations and modifications can be effected by a person of ordinary skill in the art without departing from the scope of the invention.

PARTS LIST 10. one-time-use camera
12. film cartridge
14. film winder
16. film spool
18. filmstrip
20. metering sprocket
22. small metering tooth
24. large metering tooth
26. small metering tooth
28. large metering tooth
30. small film perforation
32. large film perforation
34. metering cam
36. biasing arm
38. torsion spring
40. support post
42. frame counter
44. teeth
46. picker
48. shutter blade
50. high energy lever
52. lobes
54. metering lever
56. protuberance
58. notches
60. locking arm
62. teeth
64. latching surface
66. support post
68. return spring
70. high energy spring
72. support post
74. holder 76. scallops
78. segment

What is claimed is:

1. A camera comprising a film winder rotatable in engagement with a film spool inside a cartridge to wind an exposed filmstrip into the cartridge, a frame counter rotatable to indicate the number of exposures remaining for picture-taking and having a circular array of teeth that are successively engaged to rotate said frame counter, a metering sprocket engaged intermittently with successive perforations in the filmstrip to rotate said metering sprocket as the filmstrip is wound into the cartridge, an actuator coaxially connected to said metering sprocket for rotation in engagement with said respective teeth to rotate said frame counter, and a disabling mechanism for preventing rotation of said frame counter after the last exposure is made and keeping said metering sprocket disengaged from anyone of the film perforations to permit rotation of said film winder to complete film winding into the cartridge without rotating the frame counter and the metering sprocket, is characterized in that:

said disabling mechanism is coaxially connected to said actuator for engaging said frame counter when said metering sprocket is disengaged from the film perforations, to prevent rotation of the frame counter and the metering sprocket as said film winder is rotated to complete film winding into the cartridge.

2. A camera comprising a film winder rotatable in engagement with a film spool inside a cartridge to wind an exposed filmstrip into the cartridge, a frame counter rotatable to indicate the number of exposures remaining for picture-taking and having a circular array of teeth that are successively engaged to rotate said frame counter, a metering sprocket engaged intermittently with successive perforations in the filmstrip to rotate said metering sprocket as the filmstrip is wound into the cartridge, an actuator coaxially connected to said metering sprocket for rotation in engagement with said respective teeth to rotate said frame counter, and a disabling mechanism for preventing rotation of said frame counter after the last exposure is made and keeping said metering sprocket disengaged from anyone of the film perforations to permit rotation of said film winder to complete film winding into the cartridge without rotating the frame counter and the metering sprocket, is characterized in that:

said frame counter has a segment that extends farther than said teeth to project radially beyond the teeth, which permits said segment to be contacted without interference from anyone of the teeth; and said disabling mechanism has a holder coaxially connected to said actuator for jamming against said segment when said metering sprocket is disengaged from the film perforations, to prevent rotation of said frame counter and the metering sprocket.

3. A camera as recited in claim 2, wherein said actuator and said holder are coaxially connected at right angles to each other.

4. A camera as recited in claim 3, wherein said holder is longitudinally shorter than said actuator.

5. A camera as recited in claim 3, wherein said frame counter has a circular array of engageable portions one less than the number of said teeth, and said holder is constructed to individually engage said engageable portions one at a time when said actuator is not engaging anyone of said teeth, to hold the frame counter in place.

6. A camera as recited in claim 4, wherein said segment is located between two of said engageable portions.

* * * * *